United States Patent
Lee et al.

(10) Patent No.: US 6,934,348 B2
(45) Date of Patent: Aug. 23, 2005

(54) DEVICE FOR RECOVERING BURST-MODE OPTICAL CLOCK

(75) Inventors: Hyuek-Jae Lee, Daejeon (KR); Sung-Yong Hong, Daejeon (KR)

(73) Assignee: Roswin Co., Ltd., Chungcheongnam-do (KR)

( * ) Notice: Subject to any disclaimer, the term of this patent is extended or adjusted under 35 U.S.C. 154(b) by 733 days.

(21) Appl. No.: 10/047,928

(22) Filed: Oct. 23, 2001

(65) Prior Publication Data

US 2002/0090044 A1 Jul. 11, 2002

(30) Foreign Application Priority Data

Oct. 23, 2000 (KR) ........................................ 2000-62445

(51) Int. Cl.[7] .............................................. H03D 3/24
(52) U.S. Cl. ...................... 375/373; 375/359; 375/371; 327/165; 327/166
(58) Field of Search ................................ 375/373, 359, 375/360, 361, 371, 376; 327/165, 166, 395

(56) References Cited

U.S. PATENT DOCUMENTS

| | | | | |
|---|---|---|---|---|
| 4,604,756 A | * | 8/1986 | Moustakas et al. | 375/364 |
| 5,046,073 A | * | 9/1991 | Sexton | 375/328 |
| 5,164,966 A | * | 11/1992 | Hershberger | 375/359 |
| 5,754,606 A | * | 5/1998 | Matsuyama et al. | 375/373 |
| 5,864,250 A | * | 1/1999 | Deng | 327/165 |
| 6,741,668 B1 | * | 5/2004 | Nakamura | 375/376 |

* cited by examiner

*Primary Examiner*—Phuong Phu
(74) *Attorney, Agent, or Firm*—Dann, Dorfman, Herrell and Skillman, P.C.; Henry H. Skillman

(57) ABSTRACT

Disclosed is a device for recovering a burst-mode clock. The burst-mode clock recovery device includes a delay unit and a logic element. A reference clock is produced by implementing a logic operation with respect to a signal output from signal forming device and a signal output from the signal forming device and delayed by a delay unit. A duty of a final output signal is corrected by implementing and AND operation with respect to the generated reference clock and an output from feedback device.

3 Claims, 4 Drawing Sheets

DEVICE FOR RECOVERING BURST-MODE OPTICAL CLOCK

BACKGROUND OF THE INVENTION

1. Field of the Invention

The present invention relates to a device for a burst-mode optical clock recovery, and more particularly, to a new device for a burst-mode optical clock recovery which is a core technology in configuring an optical network.

2. Background of the Related Art

As Internet is commonly used and dependence on information and communication is increased in daily lives, service bandwidth requested is accordingly increased. Keeping pace with a Fiber To The Home strategy which requires provision of optical fiber cables to homes at a speed of at least 155 Mbps for the future, the developed countries worldwide are now under study and research. They consider a PON (Passive Optical Network) as the most practical method.

As shown in FIG. 1, the PON comprises an OLT (Optical Line Termination), an ODN (Optical Distribution Network), and an ONU (Optical Network Unit). Here, a device for recovering a burst-mode optical clock is disposed on the OLT.

Data downward to the ONU from the OLT are sent based on a TDM (Time Division Multiplexing) technology. That is to say, there are N number of time slots for information transfer. All the information is transferred to all the n number of subscribers. Each subscriber receives the information by connecting only a time slot assigned to the subscriber.

Meanwhile, data transfer from the ONU to the OLT is performed by a ranging protocol in which a time producing data is adjusted at each subscriber and data are located on a certain time slot as shown in FIG. 1. At this time, optical signals received from the OLT are different in size and phase according to each subscriber. A burst-mode optical receiving module located on the OLT converts the optical signals into electrical signals, makes signal levels constant, and instantly extracts a clock in accordance with the each slot data.

The burst-mode optical signal receiving technology is a general and universal technology applicable to any data communication addressing packet signals. Accordingly, its application range is very large.

At least two clock recovery techniques are currently known.

The first is a method using a high-speed logic gate and a feedback circuit, and the second is a method extracting a clock most close to an input signal after producing multiple clocks having different phases.

The first is representatively taught by U.S. Pat. No. 4,604,756 of Moustakas and by the method using two gated oscillators published by Lucent Technology (IEEE Journal of Lightwave Technology, Vol. 12, pp. 325–331, 1994).

The second is representatively taught by the method for extracting a clock most close to an input data among multiple clocks having different phases, which was published by Alcatel (IEEE Journal of Lightwave Technology, Vol. 12, pp. 271–279, 1994).

The method for burst-mode clock recovery published by Alcatel is so complicated and unsuitable for high-speed operation when being compared with the method disclosed in the U.S. Pat. No. 4,604,756. Therefore, the present invention is based on the method disclosed in the U.S. Pat. No. 4,604,756. However, the present invention improves the method and performs the burst-mode clock recovery in a more stable and reliable manner. Initially, the method disclosed in the U.S. Pat. No. 4,604,756 will be described in detail with reference to FIG. 2.

Referring to FIG. 2, a clock recovering system includes a T/2 delay unit 1, an XOR gate 2, an NOT gate 3, an OR gate 4, a monostable multivibrator 5, and a T delay unit 6.

FIG. 3 shows a timing diagram for explaining the method of FIG. 2.

When a time period of every bit is T, if an arbitrary data is inputted as illustrated in FIG. 3, the data is divided into a signal e1 and the other signal e2. The signal e1 is fed into the XOR gate 2 without any delay while the signal e2 is fed into the XOR gate 2 after passing through the T/2 delay unit 1.

As a result, a signal e3 is generated as illustrated in FIG. 3. Here, let s disregard a gate propagation time and a line propagation time but consider only the delay units 1 and 6.

The electrical signal e3 passes through the inverter 3 and a waveform of the electrical signal e3 is inverted. An output signal e4 is fed into the AND gate 4. At that point, supposing that a feedback signal e6 which is another input of the AND gate 4 is initially a level 1 (in T1), an output e7 of the AND gate 4 passes through the monostable multivibrator 5 and is output as a signal e5.

The monostable multivibrator 5 detects a falling edge of the output signal of the AND gate 4, is synchronized at the edge, produce a level 0 for a time of T/2, increments to the level 1 again and generates the signal e5.

The signal e5 in T1 passes through the T delay unit which is located in a feedback loop and is fed as the input signal e6 of the AND gate 4 again.

Thus, because of the feedback signal, clocks can be output in such sections as T5, T6, etc., which have no input data. However, in case that a time of the T delay unit within the feedback loop is smaller than the input data period T, the system disadvantageously suffers an extreme instability. This will be also explained in FIG. 4.

When a time of the delay unit within the feedback loop is Tf, if the Tf is slightly larger than T, there occurs a synchronization at a falling edge of the signal e4 generated by the input data and the signal e7 is generated as drawn in FIG. 4A, whereby clocks can be stably produced. That is to say, since operation is carried out according to the AND result of the signals e4 and e6, in case of FIG. 4A, a synchronization is enabled at the falling edge of the signal e4 and the monostable multivibrator sends an output. Accordingly, a falling edge of the signal e6 appearing ϵ time later does not have any effect. However, when the Tf is slightly smaller than T as shown in FIG. 4B, there occurs a synchronization at the falling edge of the fed back signal e6 and the signal e7 is output. If the signal is fed back again, a clock appears on a location of T-2ϵ. Consequently, if the feedback is repeated, the output signal e7 makes the level section 0 getting wide and the level section 1 getting narrow, resulting in output of the only level 0. That is, only the 0 level signal which is not related the input data is generated and no clocks are generated.

The aforesaid method seems to have little problem in being used for a low-speed burst-mode data clock recovery. If the speed of the input data is increased, however, even though it is fixed that Tf=T+ϵ(ϵ>0) at the initial stage, the value of Tf is varied according to various factors including temperature and others, leading to instability in the clock recovery circuit.

SUMMARY OF THE INVENTION

Accordingly, the present invention is directed to a device for recovering a burst-mode clock that substantially obviates one or more problems due to limitations and disadvantages of the related art.

An object of the present invention is to provide a device for recovering a burst-mode clock which can be stably operated regardless of whether a time of a feedback delay unit is larger or smaller than a period T of an input data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a device for recovering a burst-mode clock, the device including a T/2 delay unit, an XOR gate, a T delay unit, a NOR gate, an AND gate, an OR gate, and other T/2 delay units.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
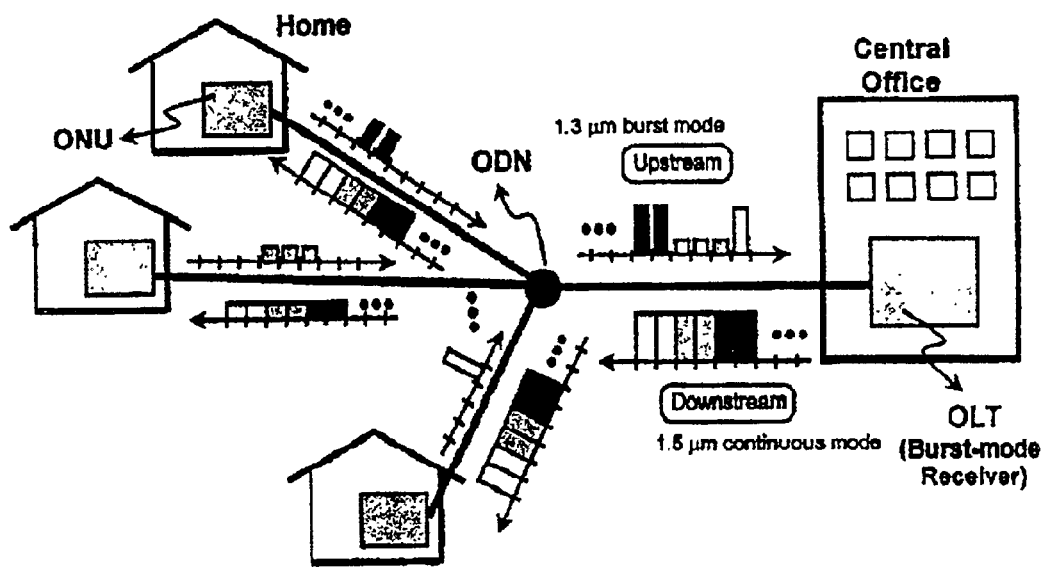
FIG. 1 illustrates a structure of a passive optical network system.
Figure 2:
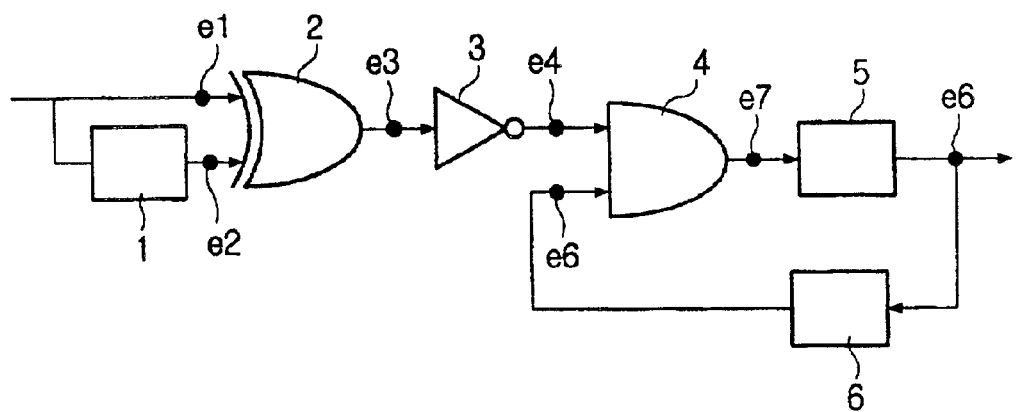
FIG. 2 illustrates a diagram of a conventional device for recovering a burst-mode clock.
Figure 3:
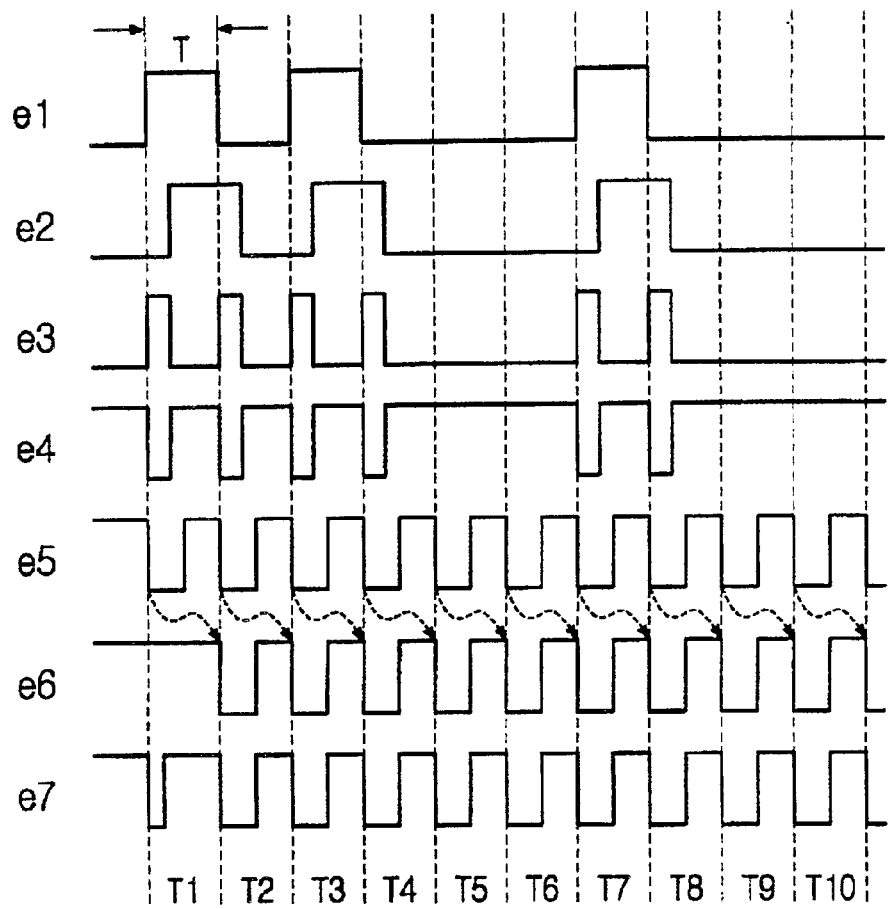
FIG. 3 illustrates a timing diagram corresponding to the burst-mode clock recovery device of FIG. 2.
Figure 4A:
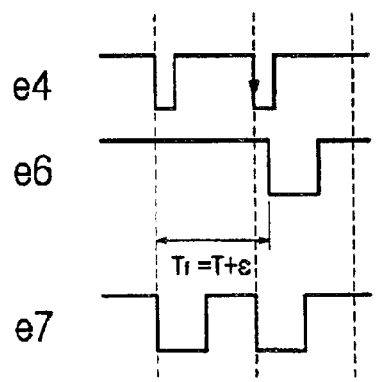
FIG. 4 illustrates a timing diagram for explaining problems of the burst-mode clock recovery device of FIG. 2.
Figure 4B:
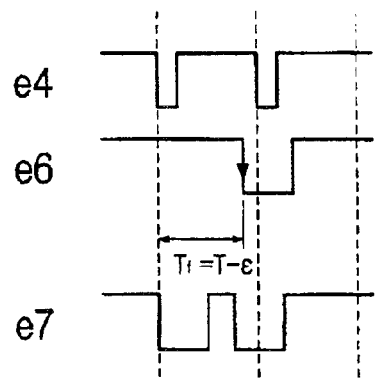
Figure 5:
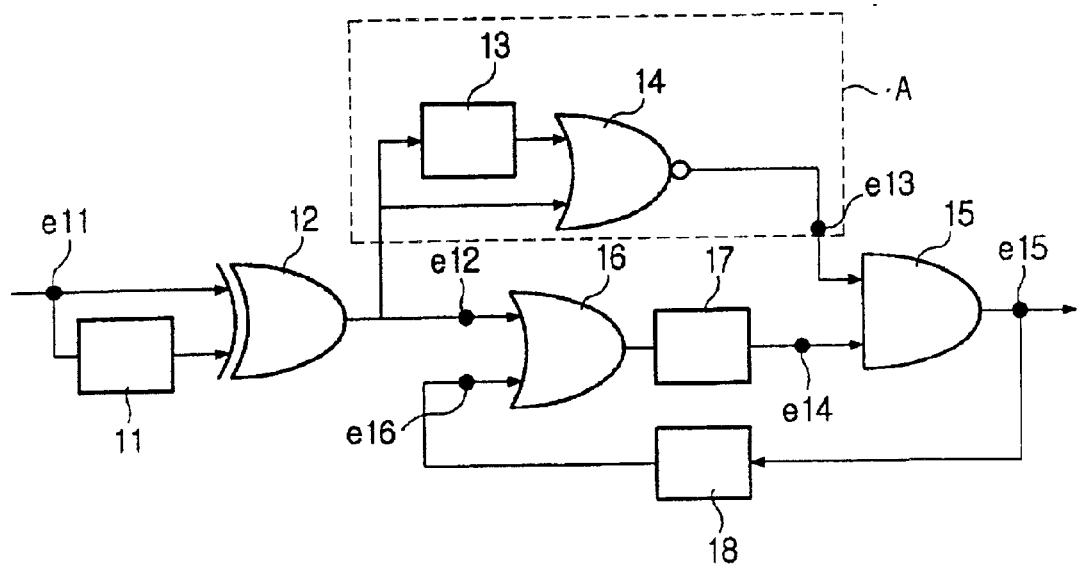
FIG. 5 illustrates a diagram of a device for recovering a burst-mode clock according to the present invention.

Referring to FIG. 5, a device for recovering a burst-mode clock according to the present invention is illustrated.

As illustrated, the burst-mode clock recovery device according to the present invention comprises a T/2 delay unit 11, an XOR gate 12, a T delay unit 13, a NOR gate 14, an AND gate 15, an OR gate 16, a T/2 delay unit 17 and a T/2 delay unit 18.

Figure 6:
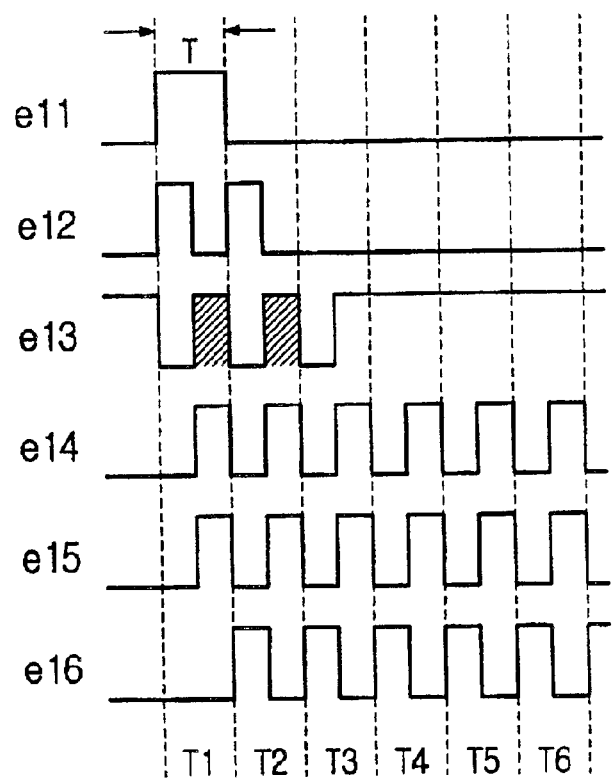
FIG. 6 illustrates a timing diagram corresponding to the burst-mode clock recovery device according to the present invention.

A timing diagram is illustrated in FIG. 6 to explain operation of the burst-mode clock recovery device of FIG. 5. For easier explanation, let s assume that data of 100000 are input.

An inputted data e11 passes through the T/2 delay unit 11 and the XOR gate 12 and a data e12 is output. When the signal e12 passes through a dotted box A in FIG. 5, a data e13 is output. Here, an attention drawing point is that other portions than the slashed portion of e13 have a level 1.

And, the signal e12 passing through the OR gate 16 becomes a signal e14 through the T/2 delay unit 17. Signals e13 and e14 are output as a signal e15 by the AND gate 15 and the output signal passes through the T/2 delay unit 18 again and fed back as an input of the OR gate 16.

A feedback loop consisting of the AND gate 15, the OR gate 16, the T/2 delay unit 17 and the T/2 delay unit 18 gives a feedback delay time by as long as a whole T. When there is no input data, the feedback loop functions to generate a clock. An important point is that whenever $\epsilon>0$ or $\epsilon<=0$ in a feedback time($Tf=T+\epsilon$) including the T/2 delay unit 17 and the T/2 delay unit 18, operation should be stably performed. Referring to the output signal e13 of the dotted box of FIG. 5, since the output signal e13 has the same pattern as the signal e12 and has the value 1 in other portions than the slashed portion, the slashed portion is output as a new clock e15 by the AND gate 15.

FIG. 7 illustrates a timing diagram for showing that a new clock can be produced by an input data either when $\epsilon>0$ or $\epsilon<=0$ in $Tf=T+\epsilon$.

Figure 7A:
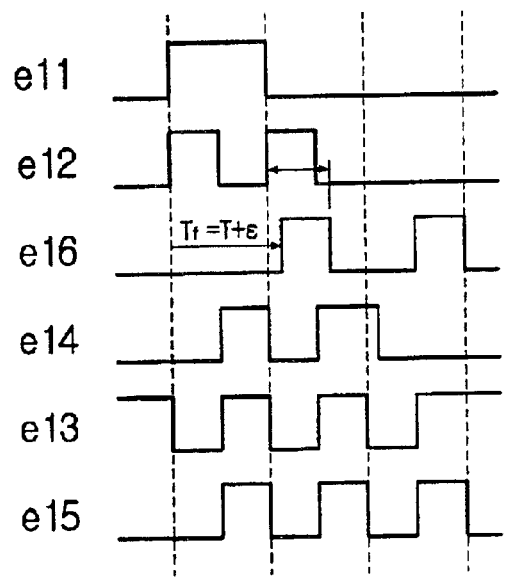
FIG. 7 illustrates a timing diagram for explaining operation of the burst-mode clock recovery device according to the present invention.

FIG. 7A shows a timing diagram in case of $\epsilon>0$. A time delay of the feedback loop is increased by as long as $\epsilon$, thereby making a second pulse getting wide. However, the pulse is gated with a slashed pulse of the e13 which is made by an input pulse, in the AND gate 15, serving to produce a steady clock like the e15 again.

Figure 7B:
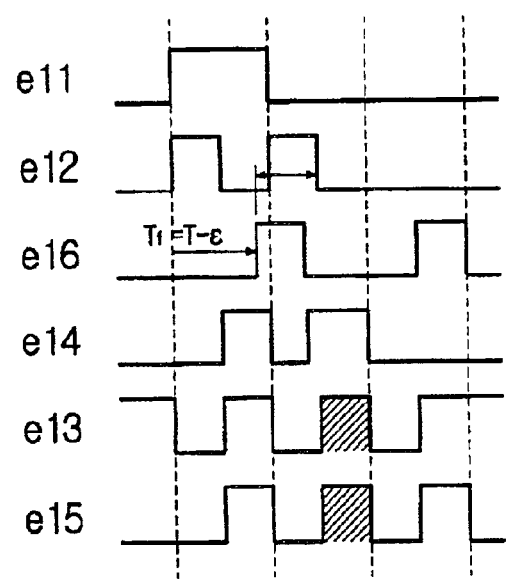

FIG. 7B shows a timing diagram in case of $\epsilon<0$. Similarly, a pulse width of the second pulse of the e14 becomes wider. However, the pulse is gated with the slashed pulse of the e13 which is made by the input data in the AND gate 15, serving to produce a steady clock.

As stated above, the present invention, a novel method capable of extracting a clock from the burst-mode data, has an advantage of eliminating problems of instability caused due to the feedback signal, which has not been solved by the conventional method. In addition, the present invention has another advantage of realizing a circuit by adding the simple logic and delay units.

In consequence, the present invention can be used as a high-speed burst-mode clock recovery device and used for clock extract of continuous data as well as the burst-mode.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A device for recovering a burst-mode clock, the device comprising:

signal forming means including a first delay unit and an exclusive OR gate having two inputs and one output, wherein a random signal sequence is applied to an input of the first delay unit and one input of the exclusive OR gate and an output of the first delay unit is applied to the other input of the exclusive Or gate;

reference clock generating means including a second delay unit and a first logic element, wherein a logic operation is implemented with respect to a signal output from the signal forming means and a signal output from the signal forming means and delayed by the second delay unit to generate a reference clock;

feedback means including a third delay unit for delaying a final output signal, an OR gate for implementing an OR operation with respect to a signal output from the signal forming means and a signal delayed in the third delay unit and a fourth delay unit for delaying an output of the OR gate to synchronize with the reference clock; and correcting means for correcting a duty of the final output signal according to an output of the reference clock generating means by implementing a logic operation with respect to outputs of the feedback means and the reference clock generating means.

2. The device of claim 1, wherein when a period of the random signal sequence is T, the first delay unit, the second delay unit and the fourth delay unit are delayed by as long as T/2 and the third delay unit is delayed by as long as T.

3. The device of claim 1, wherein in the reference clock generating means, a NOR operation is implemented with respect to the signal output from the signal forming means and the signal output from the signal forming means and delayed by the second delay unit, and the correcting means includes an AND gate.

* * * * *